United States Patent [19]

Pretorious et al.

[11] 3,725,232
[45] Apr. 3, 1973

[54] DETECTION METHOD AND APPARATUS FOR CHROMATOGRAPHY

[76] Inventors: Victor Pretorious; Hans Helmut Hahn, both of Pretoria, Republic of South Africa

[22] Filed: Feb. 23, 1971

[21] Appl. No.: 118,128

Related U.S. Application Data

[62] Division of Ser. No. 583,788, Oct. 3, 1966, Pat. No. 3,594,294.

[52] U.S. Cl. ............204/180 G, 204/299, 210/31 C, 210/198 C
[51] Int. Cl. ...............................................B01k 5/00
[58] Field of Search ............204/299, 180 R, 180 G; 210/31 C, 198 C

[56] References Cited

UNITED STATES PATENTS 673,452   5/1901   Roberts..............................204/260

Primary Examiner—John H. Mack
Assistant Examiner—A. C. Prescott
Attorney—Millen, Raptes & White

[57] ABSTRACT

Small amounts of dissolved impurities in an eluent for chromatography and which might interfere with the monitoring of a chromatogram by very sensitive, in particular electrochemical detectors, are removed by passing the eluent, on its way to a chromatographic system, through an electrochemical cleaning device. The device is divided into two parallel passages by a porous wall impregnated with a salt bridge medium. The one passage through which the eluent flows, is packed with a porous conductive medium serving as one electrode and the other passage contains a reference electrode, e.g. calomel or silver chloride. An appropriate voltage applied across the electrodes causes the electrochemical elimination of the interfering impurities.

10 Claims, 3 Drawing Figures

VICTOR PRETORIOUS
HANS HELMUT HAHN

*INVENTORS*

BY *Millen, Raptes & White*

ATTORNEYS 3,725,232

DETECTION METHOD AND APPARATUS FOR CHROMATOGRAPHY

CROSS REFERENCES TO RELATED APPLICATIONS

This application is divided from Ser. No. 583,788 filed Oct. 3, 1966 and claims the same priorities as the parent case, namely South Africa 65/5409 filed Oct. 6, 1965
South Africa 66/4568 filed Aug. 2, 1966.

BACKGROUND OF THE INVENTION

The present invention relates to an apparatus and process for the purification of an eluent, suitable particularly for use in chromatography and chromatographic analysis, involving electrochemical detection.

The parent application Ser. No. 583,788 filed Oct. 3, 1966 now U.S. Pat. No. 3,594,294 relates to a detection method for monitoring the composition of a chromatographic eluate by electrochemical reaction in which the eluate passes in liquid phase through a detector cell comprising a solid detector electrode. It has also been previously proposed to carry out such detections with a dripping mercury electrode. Additional modes of electrochemical detection in chromatography are described in our pending application Ser. No. 657,804 filed Aug. 2, 1967 now U.S. Pat. No. 3,649,498. The electrochemical detection in accordance with the parent application was found to be very sensitive. The limit of sensitivity is in the region of about $10^{-14}$ molar. Commercial solvents or solvents prepared in the laboratory itself as normally used for chromatographic analysis, including repeatedly distilled water, may be very pure according to normal criteria but still contain traces of impurities in an amount sufficient to interfere with the detection of the substances to be separated chromatographically. A more far-reaching purification of the eluents by conventional means is difficult, time-consuming and expensive. Moreover, it is difficult to keep the highly purified eluents in such a manner that recontamination is prevented.

It is an object of the present invention to provide a rapid, simple, inexpensive and practical purification of the eluent, the apparatus according to the invention being preferably connected to the chromatographic separating system itself such that the eluent is purified whilst flowing through on its way to the chromatographic separating system where it is used up immediately.

SUMMARY OF THE INVENTION

The apparatus in accordance with the invention comprises a passage for the eluent comprising an electrode, a wall of said passage being at least partly permeable by virtue of pores through said wall which are filled with a salt bridge medium to form a salt bridge, leading to a further electrode provided on the side of the wall opposite the passage and further comprising terminals for applying a voltage across the electrodes.

Preferably the apparatus is connected to the inlet end of a chromatographic separating device.

The process in accordance with the invention for using the apparatus comprises the feature that the eluent on its way to the chromatographic separation is continuously fed through the apparatus and is purified by applying a voltage between the electrodes adapted to remove said impurities from solution by electrochemical reaction.

In the particular context of electrochemical detection methods it was found to be a particular advantage that the appropriate selection of the voltage applied across the electrodes would result in the removal of particularly those impurities which would also interfere with the detection.

The apparatus is also suitable for use at comparatively high flow velocities of the eluent, e.g. for carrying out the chromatographic separation with the eluent in the turbulent range of flow velocities in accordance with our Pat. No. 3,649,498.

BRIEF DESCRIPTION OF THE DRAWINGS

In the following the invention will be further described by way of preferred embodiments with reference to the drawings.

In the drawings

DESCRIPTION OF THE PREFERRED EMBODIMENTS

Figure 1:
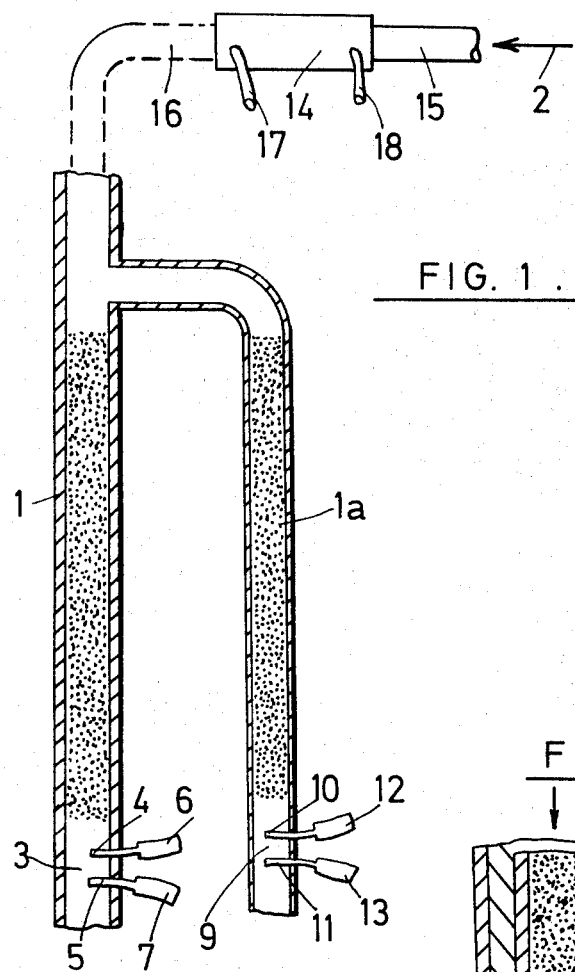
FIG. 1 represents a diagrammatic view of the apparatus in accordance with the invention installed as part of the chromatographic separating system (shown in section)

In FIG. 1 a chromatographic column is denoted by 1 and arrow 2 represents the direction of flow. At the outlet end of the column a detector cell 3 comprising electrodes 4 and 5, each with a terminal 6 and 7 respectively (in accordance with U.S. Pat. No. 3,594,294) is provided. If an appropriate voltage is applied across the terminals 6 and 7 an electrochemical oxidation or reduction of substance capable thereof and dissolved in the eluate of the chromatographic column takes place, more particularly in the presence of a supporting electrolyte, and the observation of the current, e.g. by means of a continuous recorder yields the chromatogram. Electrical noise in the system and other disturbing factors are partly eliminated by coupling the detector cell 3 with a compensating cell 9 comprising electrode 10 and 11 with terminals 12 and 13, being of similar construction as the cell 3. The compensating cell is provided at the end of a blank column 1a having essentially the same flow properties as the separating column 1.

In accordance with the invention the inlet end of the double column 1, 1a has connected thereto an eluent purifying apparatus 14 comprising an inlet end 15 and an outlet end 16 and electrical terminals 17 and 18. A predetermined voltage, e.g. tapped off a potentiometer is applied to the terminal 17, 18, this voltage being so adjusted that all impurities which would interfere with the chromatogram or the readings made by means of the detector 3 are removed from solution by electrochemical reaction. In addition the eluent may in some cases, even prior to its entrance into the purifying apparatus be freed of oxygen, e.g. by blowing nitrogen through the eluent. All this will be readily understood by those skilled in the art without having to go into more detail, e.g. that the voltage applied to the cleaning device can be so limited in practice that impurities which are inert to the conditions, e.g. voltage, prevailing in the detector and thus do not interfere, are left in solution. It will be readily understood by those skilled in the art that for any given set of operating parameters the electrochemical reaction conditions in the eluent cleaning device are essentially similar to those described in U.S. Pat. No. 3,594,294 for the detection cell. As previously stated and as described in more detail in U.S. Pat. No. 3,594,294, the voltage applied across the terminal 6 and 7 determines which substances in the eluate will undergo electrochemical reaction in the detector cell and thus give rise to a detectable signal. In accordance with exactly the same principle the voltage across the electrodes of the eluent cleaning device need only be set high enough to electro-chemically dispose of impurities which at the voltage applied to the detector cell would give rise to an undesirable background signal.

Figure 2:
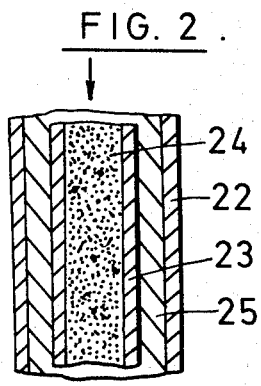
FIGS. 2 and 3 represent parts of two embodiments of the eluent purifying apparatus in section.

An embodiment of the purifying apparatus is apparent from FIG. 2 and comprises a tubular exterior wall 22 having concentrically arranged therein a porous wall represented by a sintered glass tube 23 filled with an electrically conductive liquid-pervious packing, e.g. tin shot, glassy carbon powder, silver coated plastic foam, electrically connected to one of the terminals 17, 18 according to FIG. 1. In addition the apparatus comprises a reference electrode, the electrode material of which, e.g. calomel or silver chloride, fills the space 25. The reference electrode is electrically connected to the other one of terminal 17, 18. The porous tube 23 is impregnated with agar, saturated with an electrolyte compatible with the reference electrode to form what is known in the art as a salt bridge.

Figure 3:
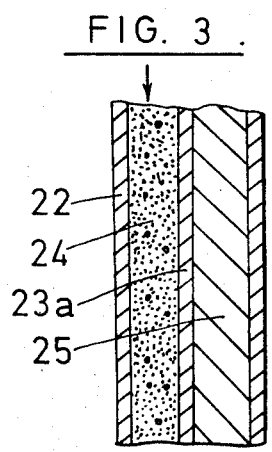

The embodiment in accordance with FIG. 3 differs from the embodiment according to FIG. 2 by the use of the porous partition wall 23a instead of the porous tube 23, similarly impregnated with electrolyte-saturated agar to form a salt bridge and dividing the tube 22 into two parallel hemi-tubular passages of which the one contains the reference electrode whilst the other contains the conductive packing 24. The partition 23a may for example be made out of porous sheets, (e.g. sintered plastic sheets) such as are used as spacers between the electrodes of lead accumulators. Such pores are readily permeable to impurities to be removed from the eluent.

What we claim is:

1. A process of chromatographic analysis which comprises continuously feeding an eluent through a passage comprising an electrode and bordered by a porous, salt bridge-impregnated surface connected through a salt bridge medium to a further electrode and applying a voltage between the electrodes adapted to remove impurities from the eluent by electro-chemical reaction, feeding eluent so treated through a chromatographic separating medium, there to effect chromatographic elution and subjecting a resulting eluate to a detection step.

2. A process as claimed in claim 1 wherein the detection step is an electrochemical detection step.

3. A process as claimed in claim 2 wherein a part of the eluent is fed from the passage through a blank separating medium and hence to a compensatory detection step coupled to the aforesaid electrochemical detection step for the reduction of background noise.

4. A process as claimed in claim 1 wherein the voltage adapted to remove said impurities is set to remove all impurities capable of being detected under the conditions of the detection step.

5. Apparatus for chromatographic analysis comprising, connected in that sequence, a feed passage for an eluent, an eluent cleaning device, an inlet portion of a chromatographic separating device, said separating device itself and an eluate monitoring device, said eluent cleaning device comprising a flow-through passage for the eluent, said passage comprising an electrode, a wall of the passage being at least partly permeable by virtue of pores through said wall which are filled with a salt bridge medium to form a salt bridge leading to a further electrode provided on the side of the wall opposite the passage and further comprising terminals for applying a voltage across the electrodes.

6. Apparatus as claimed in claim 5 wherein the eluate monitoring device comprises an electrochemical detector cell adapted for the eluate to flow therethrough, the eluate being said eluent after having passed successively through the feed passage, the flow through passage of the eluent cleaning device, the inlet portion and the chromatographic separating device.

7. Apparatus as claimed in claim 6 comprising a blank column having flow properties essentially the same as those of the chromatographic separating device and being connected between the eluent cleaning device and a compensating cell of a construction essentially similar to the electrochemical detector cell.

8. The apparatus as claimed in claim 5 wherein the electrode in the passage is formed by a porous electrically conductive medium filling said passage and wherein said further electrode is selected from the group consisting of calomel and silver chloride electrodes and fills a space adjoining said passage.

9. An apparatus as claimed in claim 8 wherein said passage is surrounded by a porous tube inside the walls of a larger chamber, said further electrode being contained in the space between the porous tube and the walls of the chamber.

10. Apparatus as claimed in claim 5 comprising a tubular body subdivided by a porous partition, constituting said at least partly permeable wall, into said passage containing said firstmentioned electrode and a further passage parallel to the firstmentioned passage containing said further electrode.

* * * * *